Sept. 12, 1939.   J. M. McSPADDEN   2,172,395
SONIC DEPTH INDICATOR APPARATUS
Filed Feb. 28, 1938
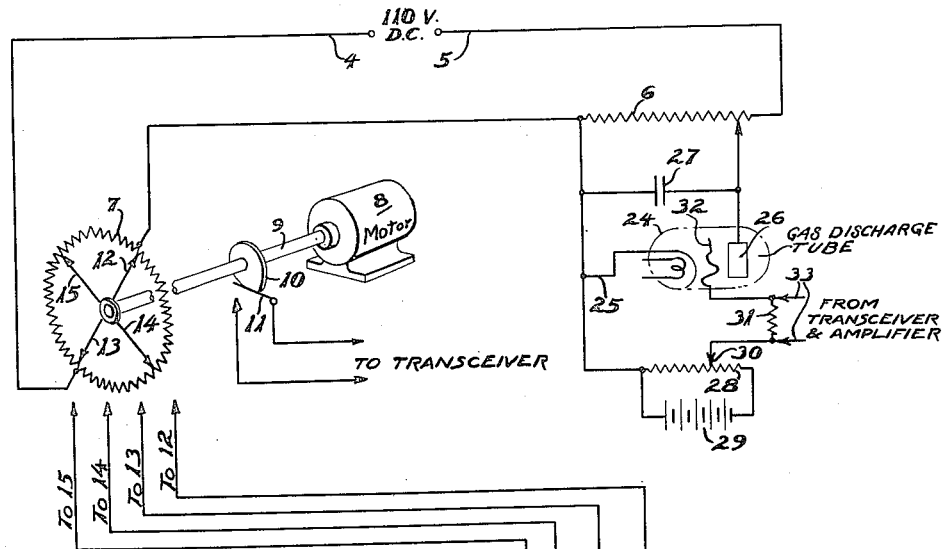
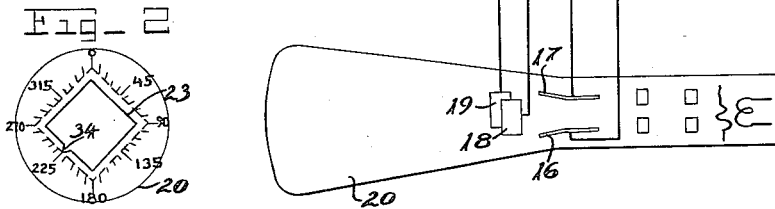
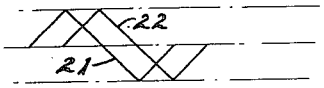
INVENTOR
JOSEPH M. McSPADDEN
BY
*Ransom K. Davis*
ATTORNEY Patented Sept. 12, 1939

2,172,395

UNITED STATES PATENT OFFICE 2,172,395

SONIC DEPTH INDICATOR APPARATUS

Joseph M. McSpadden, United States Navy

Application February 28, 1938, Serial No. 193,020

5 Claims. (Cl. 250—27)

(Granted under the act of March 3, 1883, as amended April 30, 1928; 370 O. G. 757)

This invention relates to means for ascertaining depths and distances by sonic waves and more particularly to those portions of such apparatus as are immediately concerned with producing the indication of the time at which the sonic wave is sent out and when the echo thereof returns.

Among the several objects of this invention are:

To provide means for producing a rectangular trace on a cathode tube screen;

To provide means whereby the voltage drop across one portion of a direct current circuit may be varied in response to the received energy of the sound echo;

To simplify and generally improve the apparatus immediately concerned with the indication of the received echo.

In the drawing:

Fig. 1 is a schematic circuit diagram of the present invention;

Fig. 2 is an end view of the cathode-ray tube showing the form of the trace thereon and the indication of the received echo;

Fig. 3 shows the form of the alternating voltage wave applied to the deflecting plates of the cathode ray tube.

The determination of depths or distances by the sonic wave method requires apparatus for transmitting a sonic wave associated with means for indicating the time at which the transmitted signal is sent and also means for receiving the echo of the signal and indicating the lapse of time between the transmission of the signal and the receipt of the echo. This invention is not concerned with the means for amplifying the signal energy to be transmitted, nor with the converting apparatus whereby the electrical energy is changed into the mechanical energy of sound, nor with the mechanism for translating the sound energy of the echo into electrical energy, since such means are well-known and, inasmuch as they constitute no part of the present invention, they are not shown in the drawing.

Fig. 1 depicts a direct current circuit comprising leads 4 and 5 with the resistor 6 and annular resistor 7 connected in series with the source of direct current potential between the adjacent terminals of 4 and 5, the annular resistor being connected into the circuit at diametrically opposite points. Motor 8 drives shaft 9 upon which is a cam 10 to close switch 11 periodically to send out a signal to the sound transmitting and receiving device, usually termed a transceiver. Also mounted on shaft 9 are four contact arms 12, 13, 14 and 15 that are insulated from each other and from shaft 9 and are respectively connected to the deflecting plates 16, 17, 18 and 19 of cathode ray tube 20.

The deflecting plates 16 and 17 constitute one pair and the plates 18 and 19 constitute another pair functioning in a manner well-known in this art. It will be observed that the plates in each pair are connected to contact arms that are disposed diametrically opposite each other. That is, the arms 12 and 13, respectively connected to plates 16 and 17 are disposed on a diameter, and at right angles thereto, arms 14 and 15 likewise lie on a diameter. Thus, each contact arm is spaced 90° from the arms adjacent thereto. The result is that the rotation of the contact arms by shaft 9 will vary the resistance between each arm and the points of connection of annular resistance 7 into the direct current circuit and each pair of arms will produce an alternating voltage wave such as 21 and 22 in Fig. 3, wherein it is seen that each wave is of substantially triangular form. The resultant deflection of the electron stream in the cathode ray tube 20 gives a square pattern. The contact arms 12 to 15 are connected to the respective conductive leads to the deflection plates by slip rings, but for the purpose of simplifying the drawing this has not been shown but instead a legend indicates the lead to which each arm is respectively connected.

A gaseous discharge tube 24 has its cathode 25 connected to the low potential end of resistor 6 and its plate 26 connected to resistor 6 at such point as to give the desired potential difference between cathode 25 and plate 26. Capacitor 27 is connected in parallel with resistor 6 between cathode 25 and plate 26. Resistor 28 is connected between the terminals of battery 29 and also, at one end, to cathode 25. A movable contact 30 on resistor 28 is connected through a resistor 31 to control grid 32 of the tube 24 to bias grid 32 normally negative with respect to cathode 25 and across the terminals of resistor 31 are connected the leads 33 that carry the voltage set up in the transceiver and amplifier by the received echo as is well known in this art similar to the leads 29 and 30 shown in Fig. 1 of the patent to Hayes 1,972,889. The biasing values impressed upon the electrodes of tube 24 are such that the tube is normally non-conducting and during this time the capacitor 27 is charged to a potential determined by the portion of resistor 6 connected in parallel therewith. However, when signal is received the change in potential on the grid 32 is such as to cause the tube 24 to become conducting and during such time the potential drop across the portion of resistor 6 connected in parallel with the tube will be the same as the drop across the tube, which is normally between 12 and 18 volts. The diminution in drop across resistor 6 will have the effect of increasing the drop through annular resistor 7 and will therefore result in the application of an instantaneous voltage of higher value to the deflecting plates of the cathode-ray tube 20, causing a displacement of the trace 23 as shown at 34 in Fig. 2, thus indicating the receipt of the echo from the signal. The drop across resistor 6 and across annular resistor 7 is preferably substantially equal normally, that is, in the example given about 55 volts. The duration of the time of discharge of tube 24 is determined by the capacitance of capacitor 27, since when capacitor 27 is discharged the positive bias on cathode 25 from battery 29 is sufficiently great to extinguish tube 24.

The indication in Fig. 2 is based upon the conditions that shaft 9 makes one revolution per second and that the sound wave has travelled 1500 feet before reflection, making the total path of the signal and its echo equal to 3000 feet. The velocity of transmission of sound in water being approximately 4800 feet per second, the interval between the transmission of the signal and the reception of the echo is five-eighths second. Since the cam 10 is so related to the arm 12 that the signal is sent when arms 12 and 13 are directly in contact with the lines in the direct circuit feeding into resistor 7, the above time values would produce an indication of the echo at 225°, as shown.

The invention herein described and claimed may be used and/or manufactured by or for the Government of the United States of America for governmental purposes without the payment of any royalties thereon or therefor.

I claim:

1. Apparatus of the class described, comprising a source of direct current, an annular resistor connected at one point to one side of said source, a second resistor connected in series between the other side of said source and a point on said annular resistor diametrically opposite the aforesaid point; a gas-filled discharge tube having an anode, a cathode and a control electrode with said anode and said cathode connected to spaced points on said second resistor to reduce the potential drop between said spaced points on said second resistor to a value equal to the drop through said tube when said tube passes current; a capacitor connected between said anode and said cathode to maintain said tube conducting for a predetermined time, a source of direct current potential, a potentiometer resistor connected in parallel with said source and having one terminal connected to said cathode, a conductive lead connected to said control electrode, a second conductive lead variably connected to said potentiometer resistor, a resistor connected across said leads adjacent said tube, a rotatable shaft, four radial contactor arms insulatingly fixed on said shaft at ninety degree intervals and contacting said annular resistor, an electrical conductor operatively connected to each of said arms respectively, and a cathode ray tube having two pairs of deflecting plates, each of said plates being connected to one of said conductors, the conductors to which the plates of each said pair are connected being connected respectively to contact arms that are diametrically opposite each other.

2. Apparatus of the class described, comprising a source of direct current, an annular resistor connected at one point to one side of said source, a second resistor connected in series between the other side of said source and a point on said annular resistor diametrically opposite the aforesaid point, an ionizing discharge device that is rendered conductive when a predetermined potential is applied thereto and means to control the time of discharge thereof both connected in shunt between spaced points on said second resistance; adjustable biasing means for said device to hold said device non-conducting until said predetermined potential is applied, a rotatable shaft, four radial contactor arms insulatingly fixed on said shaft at ninety degree intervals and contacting said annular resistor, an electrical conductor operatively connected to each of said arms respectively; a cathode ray tube having two pairs of deflecting plates, each of said plates being connected to one of said conductors, the conductors to which the plates of each said pair are connected being connected respectively to contact arms that are diametrically opposite each other, and means operative to impress upon said device a received voltage to render said device conductive.

3. Apparatus of the class described, comprising a source of direct current, an annular resistor connected at one point to one side of said source, a second resistor connected in series between the other side of said source and a point on said annular resistor diametrically opposite the aforesaid point, an ionizing discharge device that is rendered conductive when a predetermined potential is applied thereto and means to control the time of discharge thereof both connected in shunt between spaced points on said second resistance; adjustable biasing means for said device to hold said device non-conducting until said predetermined potential is applied, a rotatable shaft, four radial contactor arms insulatingly fixed on said shaft at ninety degree intervals and contacting said annular resistor, an electrical conductor operatively connected to each of said arms respectively, a cathode ray tube having two pairs of deflecting plates, each of said plates being connected to one of said conductors, the conductors to which the plates of each said pair are connected being connected respectively to contact arms that are diametrically opposite each other, and means responsive to a received voltage impulse to apply said predetermined potential to said tube and cause said tube to pass current whereby to decrease the potential drop across said second resistor and thereby to increase the drop across said annular resistor.

4. Apparatus of the class described, comprising a source of direct current, an annular resistor connected at one point to one side of said source, a second resistor connected in series between the other side of said source and a point on said annular resistor diametrically opposite the aforesaid point, a rotatable shaft, four radial contactor arms insulatingly fixed on said shaft at ninety degree intervals and contacting said annular resistor, an electrical conductor operatively connected to each of said arms respectively, a cathode ray tube having two pairs of deflecting plates, each of said plates being connected to one of said conductors, the conductors to which the plates of each said pair are connected being connected respectively to contact arms that are diametrically opposite each other, and means responsive to a received voltage impulse to decrease the potential drop between the terminals of said second resistor due to current from said source thereby to increase the drop across said annular resistor due to current from said source.

5. Apparatus of the class described, comprising a source of direct current, an annular resistor connected to opposite sides of said source at respective diametrically opposite points on said resistor, a rotatable shaft, four radial contactor arms insulatingly fixed on said shaft at ninety degree intervals and contacting said annular resistor, an electrical conductor operatively connected to each of said arms respectively, a cathode ray tube having two pairs of deflecting plates, each of said plates being connected to one of said conductors, the conductors to which the plates of each said pair are connected being connected respectively to contact arms that are diametrically opposite each other, and means responsive to a received voltage impulse to increase the potential drop across said annular resistor due to current from said source.

JOSEPH M. McSPADDEN.